US008868676B2

United States Patent
Acuna et al.

(10) Patent No.: US 8,868,676 B2
(45) Date of Patent: Oct. 21, 2014

(54) METHODS AND SYSTEMS FOR VERIFYING SERVER-STORAGE DEVICE CONNECTIVITY

(75) Inventors: Jorge D. Acuna, Vail, AZ (US); Ezequiel Cervantes, Tucson, AZ (US); Moiz S. Jinia, Pune (IN)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 12/902,095

(22) Filed: Oct. 11, 2010

(65) Prior Publication Data
US 2012/0089725 A1    Apr. 12, 2012

(51) Int. Cl.
*G06F 15/167* (2006.01)
*G06F 15/173* (2006.01)
*H04L 29/08* (2006.01)

(52) U.S. Cl.
CPC ................................ *H04L 67/1097* (2013.01)
USPC ............................. 709/214; 709/226; 707/781

(58) Field of Classification Search
CPC ..................... H04L 29/08549; H04L 67/1097
USPC .......... 707/705, 781, 785; 709/223–226, 213, 709/214, 229
See application file for complete search history.

(56) References Cited

U.S. PATENT DOCUMENTS

| | | | |
|---|---|---|---|
| 6,665,714 B1 * | 12/2003 | Blumenau et al. ............ | 709/222 |
| 6,742,034 B1 * | 5/2004 | Schubert et al. .............. | 709/226 |
| 6,772,204 B1 | 8/2004 | Hansen | |
| 7,039,870 B2 | 5/2006 | Takaoka et al. | |
| 7,130,909 B2 * | 10/2006 | Yamashita et al. ............ | 709/226 |
| 7,165,152 B2 * | 1/2007 | Blumenau et al. ............ | 711/152 |
| 7,203,770 B2 * | 4/2007 | Terai et al. ........................ | 710/3 |
| 7,281,044 B2 * | 10/2007 | Kagami et al. ................ | 709/226 |
| 7,343,410 B2 * | 3/2008 | Mercier et al. ................ | 709/225 |
| 7,376,898 B1 * | 5/2008 | Yehuda et al. ................ | 715/741 |
| 7,403,987 B1 * | 7/2008 | Marinelli et al. ............. | 709/223 |
| 7,469,274 B1 * | 12/2008 | Ryu et al. ...................... | 709/214 |
| 7,609,654 B2 | 10/2009 | Lubeck et al. | |
| 7,657,613 B1 * | 2/2010 | Hanson et al. ................ | 709/220 |
| 7,664,839 B1 * | 2/2010 | Karr et al. ..................... | 709/223 |
| 7,805,566 B2 * | 9/2010 | Abouelwafa et al. ......... | 711/114 |
| 7,860,015 B1 * | 12/2010 | Panelli et al. ................. | 370/241 |
| 7,870,094 B2 * | 1/2011 | Tsuge et al. .................. | 707/611 |
| 7,945,640 B1 * | 5/2011 | VanTine ....................... | 709/217 |
| 8,051,113 B1 * | 11/2011 | Shekar et al. ................ | 707/821 |

(Continued)

OTHER PUBLICATIONS

Colleen Rhodes, "Security Considerations for Storage Area Networks," 2005, 15 pages.

*Primary Examiner* — Madhu Woolcock
(74) *Attorney, Agent, or Firm* — Griffiths & Seaton PLLC

(57) ABSTRACT

Methods and systems for verifying server-storage device connectivity in a storage area network (SAN) environment are provided. One system includes determining which of a plurality of storage devices a server is physically connected and determining which of the plurality of storage devices a zoning configuration in the SAN environment enables the server to access. The method further includes returning to a user an indication of each storage device in the plurality of storage devices that the server is both physically connected and includes zoning access. One system includes a server, a plurality of storage devices, a switch fabric coupling the server to the plurality of storage devices, and a processor coupled to the server, the plurality of storage devices, and each device in the switch fabric. In this system, the processor is configured to perform the method discussed above.

11 Claims, 3 Drawing Sheets

(56) References Cited

U.S. PATENT DOCUMENTS

| | | | |
|---|---|---|---|
| 8,255,420 B2* | 8/2012 | Abushanab et al. | 707/791 |
| 2002/0129230 A1* | 9/2002 | Albright et al. | 713/1 |
| 2002/0188697 A1* | 12/2002 | O'Connor | 709/219 |
| 2002/0196744 A1* | 12/2002 | O'Connor | 370/254 |
| 2003/0061491 A1* | 3/2003 | Jaskiewicz et al. | 713/182 |
| 2003/0130821 A1* | 7/2003 | Anslow et al. | 702/186 |
| 2003/0172239 A1* | 9/2003 | Swank | 711/163 |
| 2003/0189929 A1* | 10/2003 | Matsuzaki et al. | 370/389 |
| 2003/0195953 A1* | 10/2003 | Suzuki et al. | 709/220 |
| 2003/0221001 A1* | 11/2003 | Moran et al. | 709/224 |
| 2004/0024573 A1* | 2/2004 | Allen et al. | 702/189 |
| 2004/0054782 A1* | 3/2004 | Donze et al. | 709/227 |
| 2004/0064543 A1* | 4/2004 | Ashutosh et al. | 709/224 |
| 2004/0064545 A1* | 4/2004 | Miyake | 709/224 |
| 2004/0155899 A1 | 8/2004 | Conrad | |
| 2004/0215764 A1* | 10/2004 | Allen et al. | 709/224 |
| 2004/0215831 A1* | 10/2004 | Shoji et al. | 709/249 |
| 2005/0055428 A1* | 3/2005 | Terai et al. | 709/220 |
| 2005/0114611 A1* | 5/2005 | Durham et al. | 711/154 |
| 2005/0188127 A1* | 8/2005 | Anderson et al. | 710/38 |
| 2005/0210098 A1* | 9/2005 | Nakamichi et al. | 709/203 |
| 2006/0085166 A1* | 4/2006 | Ochi et al. | 702/186 |
| 2006/0122980 A1* | 6/2006 | He et al. | 707/3 |
| 2006/0123068 A1* | 6/2006 | Cannon et al. | 707/204 |
| 2006/0182041 A1 | 8/2006 | Graves | |
| 2006/0271656 A1* | 11/2006 | Yagawa | 709/223 |
| 2007/0106861 A1* | 5/2007 | Miyazaki et al. | 711/170 |
| 2007/0220320 A1* | 9/2007 | Sen et al. | 714/13 |
| 2008/0065748 A1 | 3/2008 | Brisse | |
| 2008/0140812 A1 | 6/2008 | Chang | |
| 2008/0162681 A1* | 7/2008 | Yellapragada et al. | 709/223 |
| 2008/0281993 A1* | 11/2008 | Nicholson et al. | 710/9 |
| 2008/0301332 A1* | 12/2008 | Butler et al. | 710/38 |
| 2009/0083423 A1* | 3/2009 | Basham et al. | 709/226 |
| 2009/0157998 A1* | 6/2009 | Batterywala | 711/171 |
| 2009/0222733 A1 | 9/2009 | Basham et al. | |
| 2009/0240910 A1* | 9/2009 | Inomata et al. | 711/171 |
| 2010/0274883 A1* | 10/2010 | Yamamoto et al. | 709/223 |
| 2010/0318737 A1* | 12/2010 | Thomas et al. | 711/114 |

* cited by examiner

METHODS AND SYSTEMS FOR VERIFYING SERVER-STORAGE DEVICE CONNECTIVITY

BACKGROUND OF THE INVENTION

1. Field of the Invention

The present invention relates in general to computing systems and, more particularly, to methods and systems for verifying server-storage device connectivity in a storage area network environment.

2. Description of the Related Art

It is well known that a server and one or more storage devices need to be connected before the server and the storage device(s) are able to communicate with one another. The most common solution for ensuring that a server and a storage device are connected is for a user to verify the connectivity between the server and the storage device. This solution is usually accomplished manually. That is, the user examines the actual storage area network (SAN) configuration to ensure that the server is indeed connected to the storage device. While manually ensuring that the server and the storage device is an effective way of ensuring physical connectivity, manual inspection of the SAN configuration is time consuming and does not ensure that the server is capable of storing data on the storage device. For example, many SAN configurations include a zoning configuration that prohibits some devices and/or ports from accessing other devices and/or ports in the SAN configuration. That is, a server may be physically connected to a storage device; however, the zoning configuration of the particular SAN configuration may prohibit the server from actually accessing the storage device. As such, a manual inspection of the SAN configuration may verify that the server and the storage device are connected, but cannot verify that the server is actually capable of storing data on the storage device. Therefore, improvements to current SAN configurations are needed.

SUMMARY OF THE INVENTION

Various embodiments provide methods for verifying server-storage device connectivity in a storage area network (SAN) environment comprising a server, a processor, and a plurality of storage devices. One method comprises determining, by the processor, which of the plurality of storage devices the server is physically connected and determining, by the processor, which of the plurality of storage devices a zoning configuration in the SAN environment enables the server to access. The method further comprises returning to a user an indication of each storage device in the plurality of storage devices that the server is both physically connected and includes zoning access.

Various other embodiments provide computer storage mediums comprising a computer program product method for verifying server-storage device connectivity in a SAN environment comprising a server, a processor, and a plurality of storage devices. One computer storage medium comprises computer program code for determining, by the processor, which of the plurality of storage devices the server is physically connected and computer program code for determining, by the processor, which of the plurality of storage devices a zoning configuration in the SAN environment enables the server to access. The computer storage medium further comprises computer program code for returning to a user an indication of each storage device in the plurality of storage devices that the server is both physically connected and includes zoning access.

Other embodiments provide systems for verifying server-storage device connectivity in a SAN environment. One system comprises a server, a plurality of storage devices, a switch fabric coupling the server to the plurality of storage devices, and a processor coupled to the server, the plurality of storage devices, and each device in the switch fabric. In one embodiment, the processor is configured to determine which of the plurality of storage devices the server is physically connected, determine which of the plurality of storage devices a zoning configuration in the SAN environment enables the server to access, and return to a user an indication of each storage device in the plurality of storage devices that the server is both physically connected and includes zoning access.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide systems, methods, and computer storage mediums for verifying server-storage device connectivity in a storage area network (SAN) environment. Once connectivity is verified, a user is provided with one or more options for transferring data in a server to one or more available storage devices.

Figure 1:
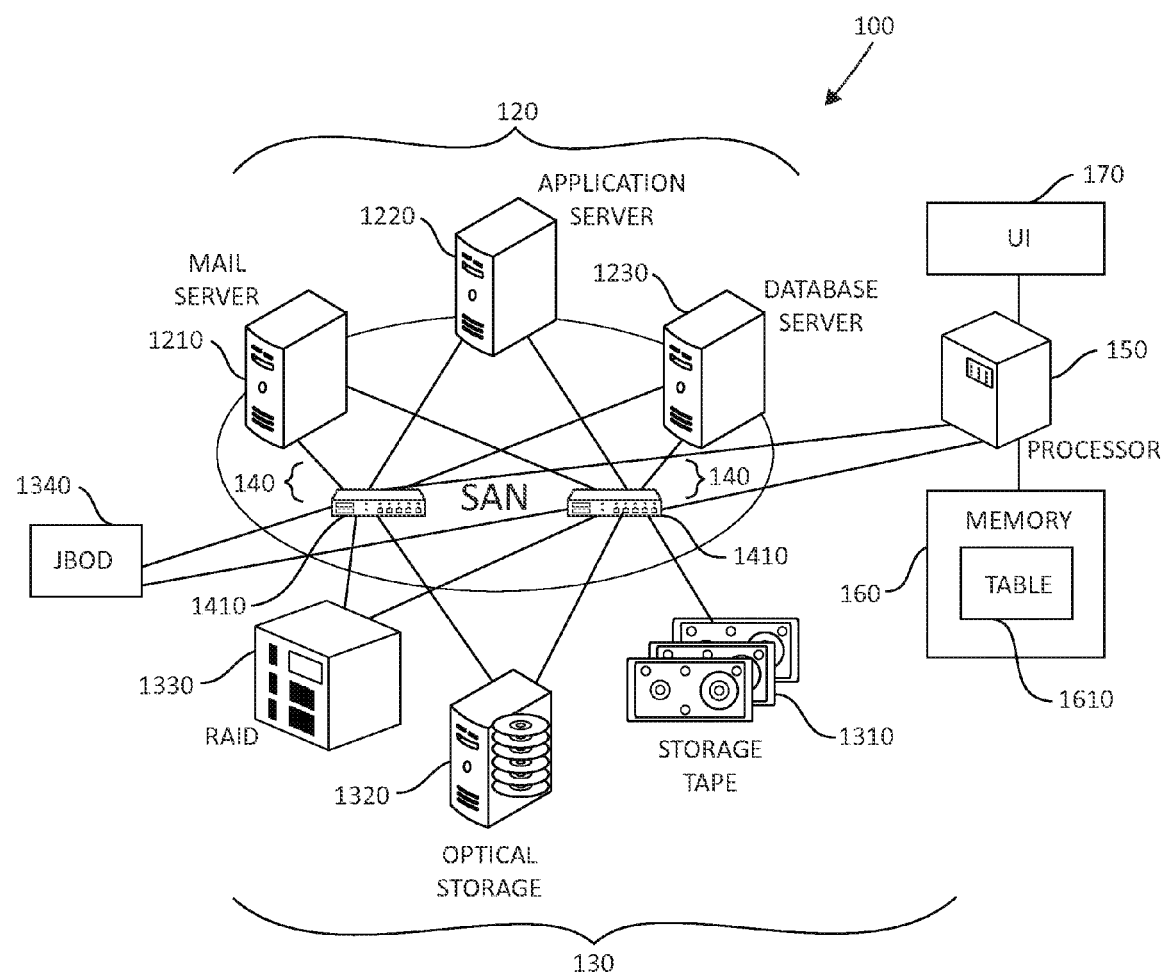
FIG. 1 is a diagram of one embodiment of a system for verifying server-storage device connectivity in a storage area network (SAN) environment.

FIG. 1 is a diagram of one embodiment of a system 100 for verifying server-storage device connectivity in a SAN environment 110. At least in the illustrated embodiment, system 100 comprises one or more servers 120 coupled to one or more storage devices 130 via a switch fabric 140. Furthermore, system 100 includes a processor 150, a memory 160, and a user interface (UI) 170 incorporated within system 100 in a manner that enables processor 150 to determine and/or verify the connectivity of server(s) 120 and storage device(s) 130.

SAN environment 110 may comprise any SAN configuration known in the art or developed in the future. That is, SAN environment 110 may include any device and/or devices and connection(s) that enable one or more servers 120 to communicate with, store data to, and retrieve data from one or more storage devices 130.

Server(s) 120 may be any type of system and/or device known in the art or developed in the future capable of operating as a computing server. Examples of servers 120 include, but are not limited to, a mail server 1210, an application server 1220, a database server 1230, and the like computing servers. In one embodiment, system 100 comprises more than one server 120. In another embodiment, system 100 comprises at least two different types of servers 120 (e.g., at least one mail server and at least one application server, at least one application server and at least one database server, at least one mail server and at least one database server, etc.). As illustrated in FIG. 1, one embodiment of system 100 comprises each of mail server 1210, application server 1220, and database server 1230. In the various embodiments of system 100, servers 120 are each configured to communicate with, store data to, and retrieve data from one or more storage devices 130.

Storage device(s) 130 may be any system and/or device known in the art or developed in the future capable of storing data and communicating with server(s) 120 such that server (s) 120 are able to store and retrieve data in storage device(s) 130. Examples of storage devices 130 include, but are not limited to, storage tape 1310, an optical storage device 1320, one or more disk storage devices (e.g., a redundant array of independent disks (RAID) configuration 1330, a just a bunch of disks (JBOD) configuration 1340, etc), and the like storage devices. In one embodiment, system 100 comprises more than one storage device 130. In another embodiment, system 100 comprises at least two different types of storage devices 130 (e.g., at least one storage tape 1310 and at least one optical storage device 1320, at least one tape 1310 and at least one RAID configuration 1320, at least one tape 1310 and at least one JBOD configuration 1340, at least one optical storage device 1320 and at least one RAID configuration 1330, at least one optical storage device 1320 and at least one JBOD configuration 1340, at least one RAID configuration 1330 and at least one JBOD configuration 1340, etc.). System 100, in yet another embodiment, comprises at least three different types of storage devices 130 (e.g., storage tape 1310, optical storage device 1320, and RAID configuration 1330; storage tape 1310, optical storage device 1320, and JBOD configuration 1340; optical storage device 1320, RAID configuration 1330, and JBOD configuration 1340; etc.). As illustrated in FIG. 1, one embodiment of system 100 comprises each of storage tape 1310, optical device 1320, RAID configuration 1330, and JBOD configuration 1340. In the various embodiments of system 100, storage device(s) 130 are coupled to servers 120 via switch fabric 140.

Switch fabric 140 may include any number of systems and/or devices (e.g., one or more switches 1410) known in the art or developed in the future capable of forming a switch fabric. In one embodiment, switch 1410 is a Fibre Channel switch and at least a portion of switch fabric 140 comprises a Fibre Channel switch fabric. In another embodiment, switch fabric 140 includes a plurality of Fibre Channel switches 1410 and at least a portion of switch fabric 140 comprises a Fibre Channel switch fabric, as illustrated in FIG. 1. In yet another embodiment (see FIG. 2), switch fabric 140 comprises a plurality of switches 1410 (e.g., Fibre Channel switches) coupled to one another and coupled between one or more servers 120 and one or more storage devices 130.

As one skilled in the art will appreciate, servers 120, storage devices 130, and switches 1410 each comprise one or more ports that enable servers 120, storage devices 130, and switches 1410 to be coupled to one another. Furthermore, each port is capable is being identified by a World Wide Port Name (WWPN). As discussed below, processor 150 uses the WWPN for each port to at least partially determine and/or verify the connectivity of server(s) 120 and storage device(s) 130.

Processor 150, in one embodiment, is configured to obtain the WWPN for each port in one or more of servers 120, the WWPM for each port in each storage device 130, and the WWPN for each port in each switch 1410. Processor 150 is also configured to query each switch 1410 to identify the WWPN for each port of an external device (server 120, storage device 130, another switch 1410, etc.) that is coupled to a port in the particular switch 1410. Furthermore, processor 150 is configured to link the WWPN of each port coupled to the port of a particular switch 1410 to create one or more paths from one or more of servers 120 through one or more of switches 1410 to one or more of storage devices 130. By creating the path(s) from server(s) 120 to storage device(s), processor 150 is capable of determining/verifying which server 120 is physically coupled to which storage device 130. While a particular server 120 may be physically coupled to a particular storage device 130, the zoning configuration of system 100 may preclude the particular server 120 from storing data to and retrieving data from the particular storage device 130.

Memory 160 is configured to store a table 1610 (e.g., a look-up table) detailing the zoning configuration of system 100. Table 1610 includes a listing of each WWPN of each port in servers 120, storage devices 130 and switches 1410. Table 1610 also lists any restrictions that any port may include. That is, a particular port in a storage device 130 may be restricted from receiving data from a port of a particular switch 1410, which is coupled to a port of a particular server. For example, with reference to FIG. 2, the zoning configuration (as stored in table 1610) may prohibit optical storage device 1320 from receiving data from and/or sending data to a port (identified by the WWPN associated with the port) in switch 1410A that is coupled to a port in mail server 1210. Here, while mail server 1210 my be physically coupled to optical storage device 1320 (via switch 1410A), the zoning configuration of system 100 prevents mail server 1210 from accessing optical storage device 1320. In addition to determining/verifying physical connectivity of servers 120 and storage devices 130, processor 150 is further configured to determine/verify accessibility of servers 120 and storage devices 130.

In one embodiment, processor 150 is configured to determine, via table 1610, which servers 120 have zoning access to which storage devices 130. That is, in one embodiment, processor is configured to, after determining/verifying the physical paths coupling servers 120 to storage devices 130, query table 1610 to determine if any zoning restrictions provided in table 1610 preclude a particular server 120 from accessing one or more storage devices. In other words, after determining/verifying that, for example, application server 1220 is physically coupled to one or more of storage tape 1310, optical storage device 1320, RAID configuration 1330, and/or JBOD configuration 1340, processor 150 is configured to query table 1610 to determine if the zoning configuration precludes application server 1220 from accessing whichever of storage tape 1310, optical storage device 1320, RAID configuration 1330, and/or JBOD configuration 1340 is physically coupled to application server 1220.

Processor 150 is further configured to provide to a user (via UI 170) which storage device(s) 130 are both physically coupled to and has zoning access to for a particular server 120 after processor 150 has made such determination/verification. In other words, processor 150 provides the user with available storage options amongst storage devices 130 for a particular server 120 from which the user desires to store data.

UI 170 may be any user interface known in the art or developed in the future. That is, UI 170 may be any system and/or device (e.g., a display, a mouse, a key board, etc) that enables a user to interact with system 100.

Figure 2:
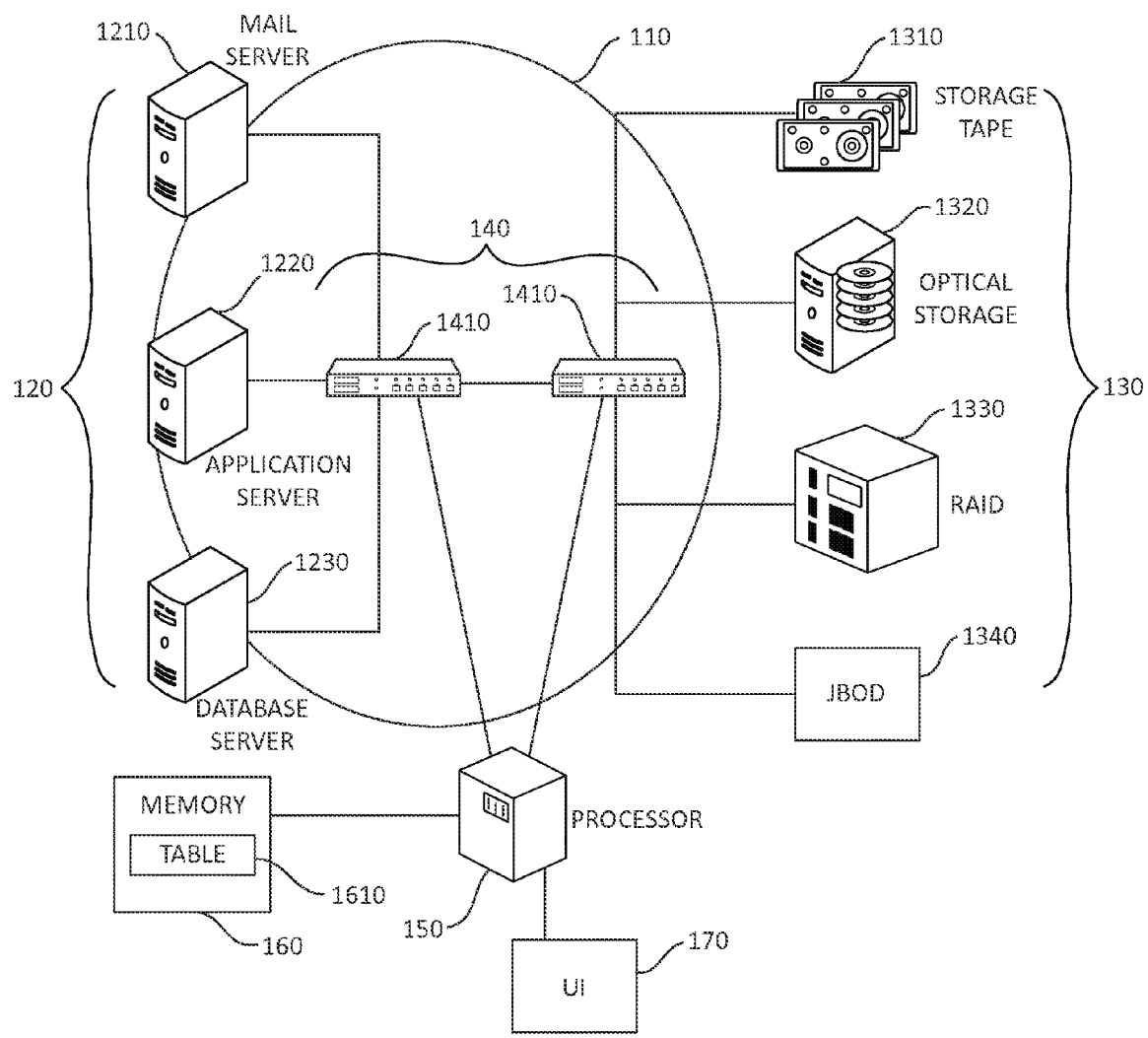
FIG. 2 is a diagram of another embodiment of a system for verifying server-storage device connectivity in a SAN environment.

While the embodiments illustrated in FIGS. 1 and 2 show processor 150, memory 160, and UI 170 as separate devices, various embodiments of system 100 contemplate that processor 150, memory 160, and/or UI 170 may be included as a portion of a single device. Furthermore, various embodiments of system also contemplate that processor 150, memory 160, and/or UI 170 may be integrated into one or more of servers 120.

Figure 3:
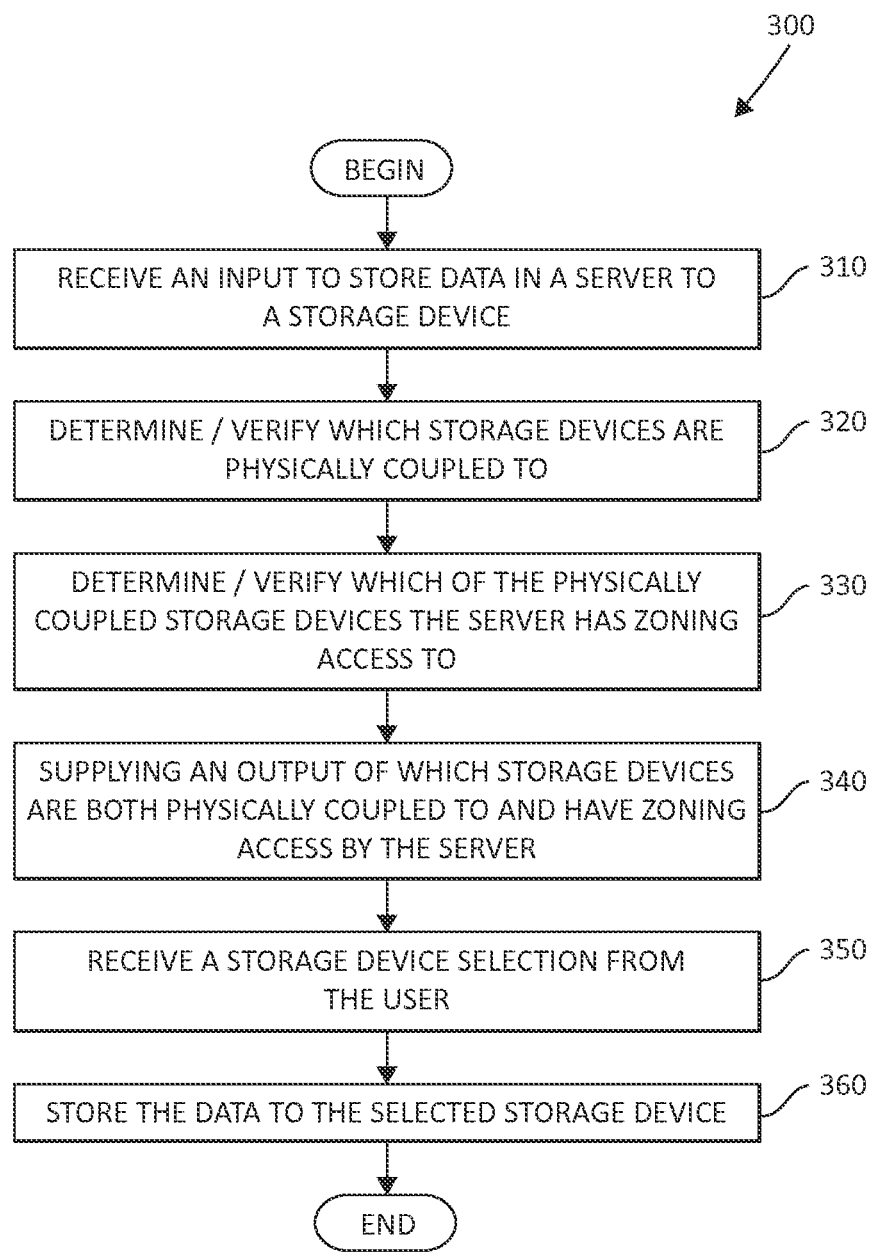
FIG. 3 is a flow diagram of one embodiment of a method for verifying server-storage device connectivity in a SAN environment.

FIG. 3 is a flow diagram of one embodiment of a method 300 for verifying server-storage device connectivity in a storage area network (SAN) environment (e.g., SAN environment 110 in FIG. 1). At least in the illustrated embodiment, method 300 begins when a processor (e.g., processor 150 in FIGS. 1 and 2) receives an input from a user to store data in a server (e.g., mail server 1210, application server 1220, database server 1230, etc. in FIGS. 1 and 2) in one or more storage devices (e.g., storage tape 1310, optical storage device 1320, RAID configuration 1330, JBOD configuration 1340, etc. in FIGS. 1 and 2) (block 310).

Method 300 further comprises determining/verifying, by the processor that the server is physically coupled to one or more storage devices (block 320). That is, the processor identifies which storage devices are physically coupled to the server. Method 300 also comprises determining/verifying, by the processor, that the server also has zoning access to one or more of the storage devices that is/are physically coupled to the server (block 330). That is, the processor identifies which of the storage devices that are physically coupled to the server that the server also has zoning access to. In one embodiment, the processor determines/verifies which of the storage devices that are physically coupled to the server that the server also has zoning access to utilizing a zoning table (e.g., table 1610 in FIG. 1).

After the processor has determined/verified which storage device(s) the server is both physically coupled to and has zoning access to, method 300 comprises supplying an output, from the processor, including a listing of such storage device(s) to the user via, for example, a user interface (e.g., UI 170 in FIGS. 1 and 2) (block 340). Method 300 also comprises receiving, by the processor, an input from the user selecting one or more of the storage devices that are both physically coupled to the server and to which the server has zoning access to as the location for storing the data (block 350).

Method 300 further comprises storing the data in the selected one or more storage devices that are both physically coupled to the server and to which the server has zoning access to (block 360). Method 300 then concludes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a computer-readable storage medium. A computer readable storage medium may be, for example, but not limited to, an electronic, magnetic, optical, crystal, polymer, electromagnetic, infrared, or semiconductor system, apparatus, or device, or any suitable combination of the foregoing. Examples (a non-exhaustive list) of computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Program code embodied on a computer-readable medium may be transmitted using any appropriate medium, including but not limited to wireless, wired, optical fiber cable, radio frequency (RF), etc., or any suitable combination of the foregoing. Computer program code for carrying out operations for aspects of the present invention may be written in any static language, such as the "C" programming language or similar programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

We claim:

1. A method for verifying server-storage device connectivity in a storage area network (SAN) environment comprising a plurality of servers, a processor, a plurality of switches, and a plurality of physical storage devices, the method comprising:
   receiving, by the processor, an input from a user to store data from a server of the plurality of servers to one or more of the plurality of physical storage devices, wherein the plurality of servers comprises at least two different types of servers selected from a mail server, an application server and a database server and wherein the plurality of physical storage devices comprises at least two different types of physical storage devices selected from an optical storage device, a tape storage device, a redundant array of independent disks (RAID) configuration, and a just a bunch of disks (JBOD) configuration;
   obtaining, by the processor, for each port in each of the plurality of servers, each of the plurality of switches, and each of the plurality of physical storage devices a World Wide Port Name (WWPN) by querying each switch of the plurality of switches to identify the WWPN of each port in each server, physical storage device, or switch that is coupled to each port in each queried switch;
   discovering, by the processor, one or more paths from one or more of the plurality of servers through one or more of the plurality of switches to one or more of the plurality of physical storage devices by, for each port of each of the queried switches, linking the obtained WWPNs of each port coupled to the respective port of the queried switch;
   determining, by the processor, which of the plurality of physical storage devices the server is physically connected to by utilizing the discovered one or more paths in response to the input;
   after determining which of the plurality of physical storage devices the server is physically connected to, determining, by the processor in response to the input, which of the plurality of physical storage devices determined to be physically connected to the server the server has zoning access to based on a zoning configuration in the SAN environment by querying a zoning table stored in memory, the zoning table detailing the zoning configuration including a listing of the WWPNs of each port in the plurality of servers, the plurality of switches and the plurality of physical storage devices and any restrictions on any ports in a path that precludes the server from accessing one or more of the plurality of physical storage devices determined to be physically connected to the server;
   returning to the user a user interface indication listing one or more eligible physical storage devices for storing the data, the eligible physical storage devices being each physical storage device of the plurality of physical storage devices that the server is determined to be both physically connected to and has zoning access to; and
   enabling the user to select one of more of the eligible physical storage devices based on the indication.

2. The method of claim 1, wherein determining which of the plurality of physical storage devices the zoning configuration enables the server to access further comprises accessing the zoning table to determine if a first port in a path between the server and a physical storage device to which the server is physically connected is denied access to a second port in the path or to the physical storage device.

3. The method of claim 1, further comprising:
   receiving, by the processor, a selection from the user to which of the eligible physical storage devices to store the data.

4. A computer storage memory storing computer program code for verifying server-storage device connectivity in a storage area network (SAN) environment comprising a plurality of servers, a processor, a plurality of switches, and a plurality of physical storage devices, the computer storage memory comprising:
   computer program code for receiving, by the processor, an input from a user to store data from a server of the plurality of servers to one or more of the plurality of physical storage devices, wherein the plurality of servers comprises at least two different types of servers selected from a mail server, an application server and a database server and wherein the plurality of physical storage devices comprises at least two different types of physical storage devices selected from an optical storage device, a tape storage device, a redundant array of independent disks (RAID) configuration, and a just a bunch of disks (JBOD) configuration;
   computer program code for obtaining, by the processor, for each port in each of the plurality of servers, each of the plurality of switches, and each of the plurality of physical storage devices a World Wide Port Name (WWPN) by querying each switch of the plurality of switches to identify the WWPN of each port in each server, physical storage device, or switch that is coupled to each port in each queried switch;
   computer program code for discovering, by the processor, one or more paths from one or more of the plurality of servers through one or more of the plurality of switches to one or more of the plurality of physical storage devices by, for each port of each of the queried switches, linking the obtained WWPNs of each port coupled to the respective port of the queried switch;
   computer program code for determining, by the processor, which of the plurality of physical storage devices the server is physically connected to by utilizing the discovered one or more paths in response to the input;

computer program code for determining, by the processor after determining which of the plurality of physical storage devices the server is physically connected to, in response to the input, which of the plurality of physical storage devices determined to be physically connected to the server the server has zoning access to based on a zoning configuration in the SAN environment by querying a zoning table stored in memory, the zoning table detailing the zoning configuration including a listing of the WWPNs of each port in the plurality of servers, the plurality of switches and the plurality of physical storage devices and any restrictions on any ports in a path that precludes the server from accessing one or more of the plurality of physical storage devices determined to be physically connected to the server;

computer program code for returning to the user a user interface indication listing one or more eligible physical storage devices for storing the data, the eligible physical storage devices being each physical storage device of the plurality of physical storage devices that the server is determined to be both physically connected to and has zoning access to; and computer program code for enabling the user to select one or more of the eligible physical storage devices based on the indication.

5. The computer storage memory of claim 4, wherein the computer program code for determining which of the plurality of physical storage devices the zoning configuration enables the server to access further comprises computer program code for accessing the zoning table to determine if a first port in a path between the server and a physical storage device to which the server is physically connected is denied access to a second port in the path or to the physical storage device.

6. The computer storage memory of claim 4, further comprising:

computer program code for receiving, by the processor, a selection from the user to which of the eligible physical storage devices.

7. A system for verifying server-storage device connectivity in a storage area network (SAN) environment, comprising:

a plurality of servers;

a plurality of physical storage devices;

a switch fabric comprising a plurality of switches coupling the plurality of servers to the plurality of physical storage devices; and a processor coupled to the plurality of servers, the plurality of physical storage devices, and each switch in the switch fabric, wherein the processor is configured to:

receive an input from a user to store data from a server of the plurality of servers to one or more of the plurality of physical storage devices, wherein the plurality of servers comprises at least two different types of servers selected from a mail server, an application server and a database server and wherein the plurality of physical storage devices comprises at least two different types of physical storage devices selected from an optical storage device, a tape storage device, a redundant array of independent disks (RAID) configuration, and a just a bunch of disks (JBOD) configuration, obtain for each port in each of the plurality of servers, each of the plurality of switches, and each of the plurality of physical storage devices a World Wide Port Name (WWPN) by querying each switch of the plurality of switches to identify the WWPN of each port in each server, physical storage device, or switch that is coupled to each port in each queried switch;

discover one or more paths from one or more of the plurality of servers through one or more of the plurality of switches to one or more of the plurality of physical storage devices by, for each port of each of the queried switches, linking the obtained WWPNs of each port coupled to the respective port of the queried switch;

determine which of the plurality of physical storage devices the server is physically connected to by utilizing the discovered one or more paths in response to the input, after determining which of the plurality of physical storage devices the server is physically connected to, in response to the input determine which of the plurality of physical storage devices determined to be physically connected to the server the server has zoning access to based on a zoning configuration in the SAN environment by querying a zoning table stored in memory, the zoning table detailing the zoning configuration including a listing of the WWPNs of each port in the plurality of servers, the plurality of switches and the plurality of physical storage devices and any restrictions on any port in a path that precludes the server from accessing one or more of the plurality of physical storage devices determined to be physically connected to the server, return to the user a user interface indication listing one or more eligible physical storage devices for storing the data, the eligible physical storage devices being each physical storage device of the plurality of physical storage devices that the server is determined to be both physically connected to and has zoning access to, and enable the user to select one or more of the eligible physical storage devices based on the indication.

8. The system of claim 7, wherein the processor is further configured to access the zoning table to determine if a first port in a path between the server and a physical storage device to which the server is physically connected is denied access to a second port in the path or to the physical storage device when the processor determines which of the plurality of physical storage devices the zoning configuration enables the server to access.

9. The system of claim 8, wherein the zoning table comprises a respective zoning configuration for each port.

10. The system of claim 7, wherein the processor is further configured to:

receive a selection from the user to which of the eligible physical storage devices to store the data.

11. The system of claim 7, wherein the processor is configured to determine if the server is physically connected to the at least two different types of physical storage devices when the processor determines which of the plurality of physical storage devices the server is physically connected to.

\* \* \* \* \*